(12) United States Patent
Kashi et al.

(10) Patent No.: US 11,900,312 B2
(45) Date of Patent: Feb. 13, 2024

(54) PACKAGE ANALYSIS DEVICES AND SYSTEMS

(71) Applicant: SMIOTA, INC., Pleasanton, CA (US)

(72) Inventors: Manjunatha Kashi, Milpitas, CA (US); Khurram Mahmood, Walnut Creek, CA (US); Kailasnath Dornadula, Fremont, CA (US); Shashank Pavan Segu, Milpitas, CA (US); Raiymbek Akshulakov, Nur-Sultan (KZ)

(*) Notice: Subject to any disclaimer, the term of this patent is extended or adjusted under 35 U.S.C. 154(b) by 824 days.

(21) Appl. No.: 16/572,615

(22) Filed: Sep. 17, 2019

(65) Prior Publication Data
US 2020/0013011 A1    Jan. 9, 2020

Related U.S. Application Data

(63) and a continuation-in-part of application No. 15/092,585, filed on Apr. 6, 2016, now Pat. No. 10,891,584.

(60) Provisional application No. 62/732,800, filed on Sep. 18, 2018.

(51) Int. Cl.
| | |
|---|---|
| G06Q 10/0836 | (2023.01) |
| H05K 5/00 | (2006.01) |
| G06T 7/62 | (2017.01) |
| G07B 17/00 | (2006.01) |
| G07F 9/00 | (2006.01) |
| G07F 17/12 | (2006.01) |
| G06V 20/00 | (2022.01) |
| G06V 30/424 | (2022.01) |

(52) U.S. Cl.
CPC .......... *G06Q 10/0836* (2013.01); *G06T 7/62* (2017.01); *G06V 20/00* (2022.01); *G06V 30/424* (2022.01); *G07B 17/00661* (2013.01); *G07F 9/001* (2020.05); *G07F 9/002* (2020.05); *G07F 17/13* (2020.05); *H05K 5/0017* (2013.01); *G07B 2017/00685* (2013.01)

(58) Field of Classification Search
CPC .................. G06Q 10/0836; G06T 7/62; G06T 2207/30112; G06V 10/42; G06V 20/00; G06V 30/424; G07B 17/00661; G07B 2017/00685; G07B 2017/00056; G07B 2017/00725; G07F 9/001; G07F 9/002; G07F 17/13; G07F 9/006; H05K 5/0017; G07C 9/00896
See application file for complete search history.

(56) References Cited

U.S. PATENT DOCUMENTS

| | | | | |
|---|---|---|---|---|
| 4,865,248 | A * | 9/1989 | Barth | E05B 35/086 |
| | | | | 312/215 |
| 9,745,130 | B1 * | 8/2017 | Rawal | B65G 1/137 |
| 10,853,757 | B1 * | 12/2020 | Hill | G06Q 10/06398 |
| 11,361,278 | B2 * | 6/2022 | Dattamajumdar | A61G 12/001 |

(Continued)

*Primary Examiner* — Molly Wilburn

(57) ABSTRACT

Disclosed herein are systems and methods for analyzing one or more package. In an embodiment, disclosed is a method comprising determining, by a sensor component of a package analysis device comprising a processor that executes computer executable components stored in a memory and the memory that stores computer executable components, a presence of a package and a set of dimensions of the package and extracting, by an image capturing component of the package analysis device, a set of image data from a package label based on a determined presence of the package.

20 Claims, 13 Drawing Sheets

(56) References Cited

U.S. PATENT DOCUMENTS

| | | | |
|---|---|---|---|
| 2005/0234785 A1* | 10/2005 | Burman | G06K 19/07703 |
| | | | 705/28 |
| 2008/0195247 A1* | 8/2008 | Mallett | G07F 11/62 |
| | | | 700/231 |
| 2010/0138037 A1* | 6/2010 | Adelberg | G07F 9/001 |
| | | | 700/241 |
| 2015/0120601 A1* | 4/2015 | Fee | G06Q 10/0836 |
| | | | 705/339 |
| 2016/0027261 A1* | 1/2016 | Motoyama | G06Q 10/04 |
| | | | 340/313 |
| 2017/0154347 A1* | 6/2017 | Bateman | G06Q 50/28 |
| 2018/0101820 A1* | 4/2018 | Peynet | G07C 9/00896 |
| 2018/0121865 A1* | 5/2018 | Rubinstein Apozdava | |
| | | | G06Q 30/0283 |
| 2018/0121873 A1* | 5/2018 | Walsh | G06Q 10/0836 |
| 2018/0197139 A1* | 7/2018 | Hill | G06T 7/593 |
| 2020/0410621 A1* | 12/2020 | Wagner | G06K 7/10366 |
| 2021/0049846 A1* | 2/2021 | Kashi | G07C 9/00912 |
| 2021/0319195 A1* | 10/2021 | Chakravarty | G06K 7/1417 |

\* cited by examiner

PACKAGE ANALYSIS DEVICES AND SYSTEMS

CROSS-REFERENCE TO RELATED APPLICATIONS

This application claims priority to U.S. Patent Application No. 62,732,800 titled, "Package Analysis Devices and Systems", and filed on Sep. 18, 2018. This application also claims priority to U.S. patent application Ser. No. 15,092,585 titled, "Devices, Systems, and Methods for Storing Items", and filed on Apr. 6, 2016, which claims priority to U.S. Patent Application No. 62,146,187 titled, "Smart Mailbox System" and filed on Apr. 10, 2015. The entirety of the disclosures of the aforementioned applications are considered part of, and is incorporated by reference in, the disclosure of this application.

BACKGROUND

Often couriers delivering packages are required to undertake a series of steps to deliver a package to a recipient. In the case of some smart locker devices, the courier typically enters a recipient's information at a user interface on the smart locker device, then selects the recipient's name from a menu. The courier can then select a size of the package being delivered (e.g., small, medium, large) and then scans a barcode on the package. A locker door then open's and the courier can deposit the package in the locker and shut the door. This example delivery sequence takes much time, effort, and is fraught with inefficiencies. The courier also often has to deliver several packages and must follow the same time-consuming procedure. As such, new devices, systems, and processes are needed to overcome the challenges, issues, and problems with the current package delivery process.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein are systems, devices, apparatuses, computer program products and/or computer-implemented methods that employ system components to analyze one or more package.

According to an embodiment, a computer-implemented method is provided. The computer-implemented method can comprise determining, by a sensor component of a package analysis device comprising a processor and a memory, a presence of a package and a set of dimensions of the package. In an aspect, the computer-implemented method can include extracting, by an image capturing component of the package analysis device, a set of image data from a package label based on a determined presence of the package. In another aspect, the computer-implemented method can include determining, by a processor of the package analysis device, the set of dimensions of the package from the extracted image data based on a processing algorithm. In yet another aspect, the computer-implemented method can also comprise determining, by an image extraction component of a server device, a set of package information based on an optical character recognition algorithm applied to the set of image data. The computer-implemented method can also transmit, by a transmission component of the package analysis device, a set of unlocking instructions to a smart locker device based on the set of package information and the set of dimensions of the package. The computer-implemented method can also include unlocking, by a smart locker device, a compartment door based on the set of unlocking instructions.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
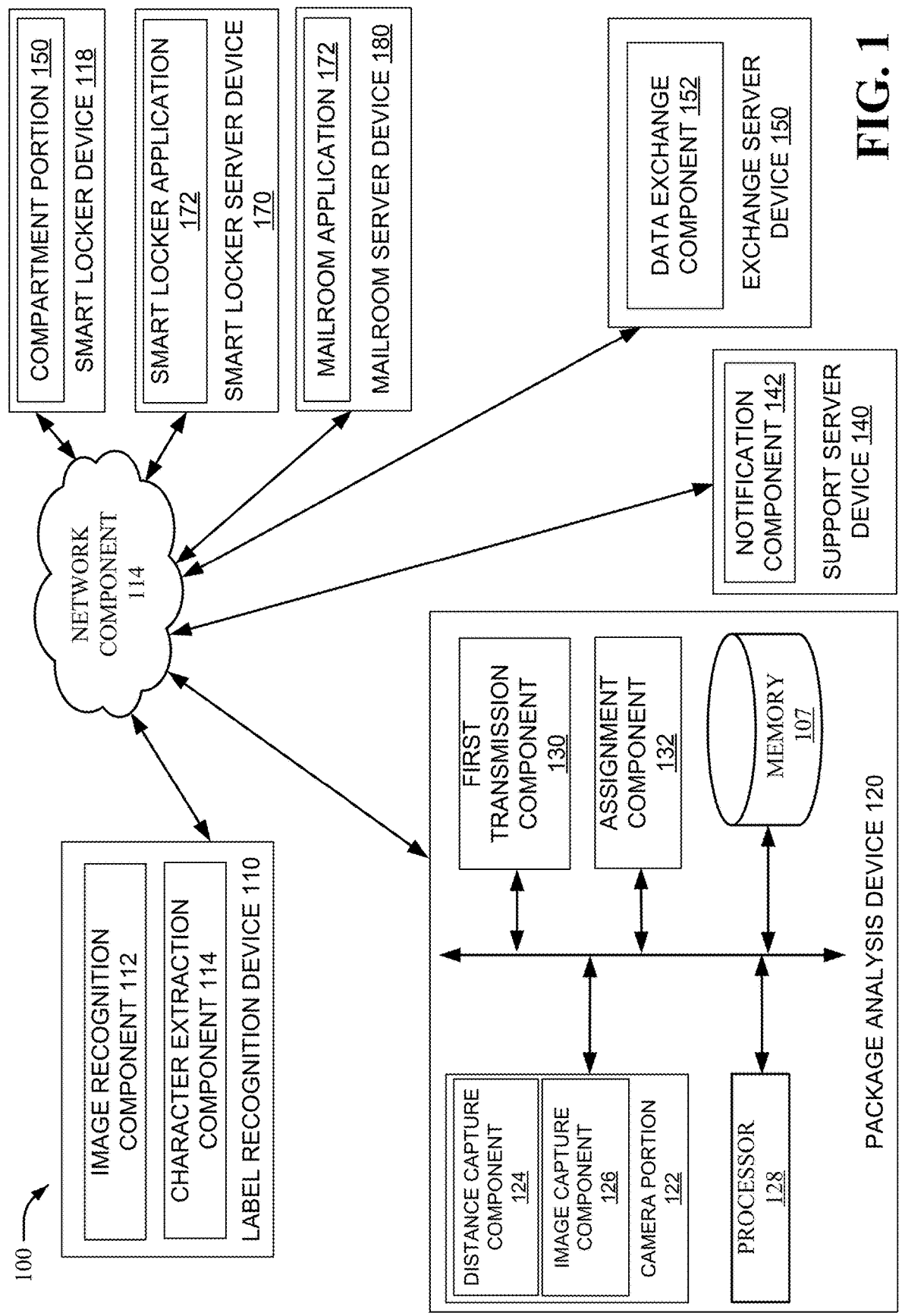
FIG. 1 illustrates a flow diagram of an example, non-limiting computer-implemented system 100 that facilitates an analysis of one or more package in accordance with one or more embodiments described herein.

Turning now to FIG. 1A, illustrated is a non-limiting computer-implemented system 100 that facilitates an analysis of one or more package in accordance with one or more embodiments described herein. In an aspect, FIG. 1A comprises label recognition device 110, package analysis device 120, support server device 140, exchange server device 150, mailroom server device 180, smart locker server device 170, smart locker device 118, and network 114.

In an aspect, package analysis device 120 can be a device that analyzes packages using various device components. For instance, package analysis device 120 can determine the dimensions of a package, such dimensions comprising a length, breadth (also referred to as width) and height. Furthermore, package analysis device 120 can retrieve package label information in connection with label recognition device 110 (e.g., a server) that performs optical character recognition operations on one or more image (e.g., image data) of the package label. In another aspect, package analysis device 120 in connection with mailroom application 172 can automatically unlock a smart locker compartment door of smart locker device 118 automatically based on a fit between the package dimensions (e.g., determined length, breadth, and height) and the containment size of the smart locker compartment. In yet another aspect, package analysis device 120 in connection with a mailroom server device 180 can determine an appropriate grid and coordinates within a grid corresponding to a package room to which the package can be stored based on the package dimensions and the space available at the respective grid coordinates.

In yet another aspect, package analysis device 120 can comprise a circuit board comprising one or more microprocessor(s), memories, input/output capabilities and other such features. In another aspect, package analysis device 120 can comprise an industrial camera that facilitates execution of optical character recognition operations. For instance, the industrial camera can inspect and verify number, character (e.g., in varying fonts, sizes, styles, etc.), and language (types) present on a label of a package. Furthermore, the industrial camera element can be trained to allow for the characterization and classification of various data sets (e.g., determine shape, size, consistency of characters, numerals, letters, symbols, logos, images, etc.). In one or more non-limiting embodiments, a depth sensor or camera can be employed to measure a package height. For instance, the package can be located on a table or podium that is a set distance from package analysis device 120 (or the camera on device 120). The depth camera can measure the difference in height between the package analysis device 120 and top surface of a package resting on the podium and subtract such distance from the distance between the podium and device 120 to arrive at the package depth.

In another non-limiting embodiment, package analysis device 120 can comprise a power supply for the computer board or circuit board and/or a containment mechanism to integrate all of the components. In other embodiments, package analysis device 120 can be communicatively coupled to a smart locker device 118 and allow for the efficient determination of a package size (e.g., dimensions) and simultaneous opening of a locker compartment door of smart locker device 118 based on the determined dimensions of the package. Furthermore, in an aspect, package analysis device 120 can retrieve optical character recognition information from package label information, capture (e.g., with an industrial camera) one or more package image(s), and assign package identification information (e.g., UUID) to a package.

In yet another aspect, package analysis device 120 can employ a computer board (e.g., UP Board), an autofocus camera (e.g., 13 megapixel or other such megapixel quantity camera for instance), and a depth camera (e.g., real sense depth camera). In an instance, the depth camera can measure a distance between an obstacle (e.g., a package top surface) and a module of package analysis device 120 (e.g., module integrating all device elements). In one or more non-limiting embodiments, an ultrasonic sensor can be employed to capture the distance. In another aspect, package analysis device 120 can comprise an autofocus camera to capture one or more image of a package label and/or a package top surface (e.g., to extract boundary information to ascertain length and breadth dimensions of the package).

In an aspect, package analysis device 120 can generate significant efficiencies for mailroom package delivery operations. For instance, in the absence of device 120, a mailroom administrator can take several dozens of minutes to determine a place to store a package within a mailroom and even so it may not be an optimal storage location. However, package analysis device 120 allows for the mailroom administrator to take 15-25 seconds to secure a package by employing the automated mechanisms of dimension determination and grid location to store such package. In a non-limiting embodiment, a mailroom can be an enclosed room controlled by a smart lock. Furthermore, the grid can identify locations with the mailroom that indicate storage locations for packages in an organized manner within the enclosed room (e.g., on shelf's, floors, etc.)

Furthermore, in one or more non-limiting embodiment, package analysis device 120 can take 2-3 seconds to search for an optimal image clarity, 0.2-0.4 seconds to determine a package dimensions used to open a respective optimal sized smart locker compartment door, and 2-3 seconds to retrieve text information form a package label. As such, package analysis device 120 can perform several discrete operations in a continuous, quick, optimal, and efficient manner.

In yet another aspect, package analysis device 120 can scan a package, determine the dimension of such package and transmit such information (e.g., via network component 114) to a smart locker application 172 executing on one or more smart locker server device 170. Furthermore, smart locker application 172 can determine an optimal locker compartment based on a matching of locker compartment dimensions to dimension data (received from package analysis device 120) of a respective package and transmit unlock operations to a respective compartment door of smart locker device 118. Furthermore, a door of compartment portion 150 can be opened accordingly to a receive and store a package.

In another aspect, package analysis device 120 can also generate dimension data of a package and transmit such dimension data to a mailroom application 172 executed by mailroom server device 180. Furthermore, mailroom application 172 can receive such package dimension data and transmit such information to a data exchange component 152 of exchange server device 150 for storage of such data within a data store and coupling of such data to other respective package information such as bar code data, UUID data, and other identification information. As such, a mailroom administrator user can deposit the package in a locker, scan the package barcode, and such barcode scanning can trigger an opening of a respective smart locker compartment door (e.g., compartment component 150) based on the dimensions of the compartment accommodating the dimensions of the package. Furthermore, the scanning of the barcode, can transmit such scan information for reference at at data exchange component 152 of exchange server device, which can transmit instructions to trigger an opening of a respective compartment door corresponding to such package bar code information (as determined by exchange server device 150.

In yet another aspect, package analysis device 120 can determine dimensions of a package and receive package recipient data. For instance, package analysis device 120 can retrieve such information from exchange server device 150 (e.g., can be a data store) where such information can correspond to a range of smart locker devices (e.g., third party devices) or a range of mailroom applications corresponding to a range of smart locker devices. In yet another non-limiting embodiment, package analysis device 120 can employ a display component that presents various package information such as text that has been determined from a package label via optical character recognition mechanisms and/or package dimension data. In another non-limiting embodiment package analysis device 120 can detect whether a package or another object is situated under the package analysis device 120. In yet another aspect, package analysis device 120 can capture bar code information, detect a shape of the package, and identify tracking numbers and/or barcodes present on a package.

In a non-limiting embodiment, package analysis device 120 can employ camera portion 122 in connection with distance capture component 124. In an aspect, a first camera of camera portion 122 can be a depth detection camera that in connection with distance capture component 124 can capture a first depth measurement between the camera portion 122 and an empty surface (e.g., podium, floor, table, etc.) located below the camera portion 122. Furthermore, in an aspect, camera portion 122 can detect a change in depth between the first depth and a second depth measurement that is the distance between the camera portion 122 and the top surface of the package. In an aspect, the camera portion 122 can determine the package depth or height as the difference between the first depth measurement and the second depth measurement.

In yet another aspect, a second camera of camera portion 122 can be an industrial camera. In an aspect, upon the determination of height by the depth camera, the second camera can be initiated, and the depth camera can power down, such that the second camera captures photos represented by image data of the package top surface. The second camera can capture a continuous set of photos until one or more images present independently or in combination achieve an optimal clarity. In another aspect, a clarity of one or more image of the top surface of the package can be determined based on a variance of the output produced by a Laplacian python OpenCV filter. In an aspect, image capture component 126 can determine contours and bounding boxes based on a comparison of the package data to data within an open CV library. In an aspect, image capture component 126 can compare the clarity of an image to a threshold clarity value to determine a clarity variance. If the variance between the image clarity and the threshold clarity is low is low then the image clarity is sub-par, however if the variance is high between the image clarity and the threshold clarity then the clarity can be determined to be optimal.

In an aspect, once image capture component 126 can determines an optimal clarity is achieved, then the package contours is retrieved by accessing one or more data store (e.g., python OpenCV library). In an aspect, a contour can be a curve joining all the continuous points along a boundary determined to be an edge of a package surface. Furthermore, a contour can be determined based on such continuous points having the same (or a sufficiently similar) color or intensity value. Furthermore, in an aspect, image capture component 126 can determine respective contours to skip (e.g., smaller contours) and respective contours to combine. For instance, a package may have many different edges and shapes that appear as part of image data. As such, image capture component 126 can determine respective contours (e.g., larger contours) to combine. Furthermore, the contours can be combined to provide a fixed size of a package. For instance, a minimal bounding box can be identified (e.g., using image capture component 126) and such minimal bounding box can account for the rotation of the package (e.g., package placed under the package analysis device 120 at an angle or not straight).

In an aspect, image capture component 126 can determine the corners of the box to determine the position of the package. In another aspect, once the position and contours of the package are determined (e.g., using image capture component 126), then camera portion 122 can determine the actual dimensions (e.g., length and/or width or breadth) of the package based on an evaluation of the pixel data within the bounding box representing the top surface of the package. In an instance, contours such as tape on the package are ignored and not used for a determination of a package external contour. Furthermore, in an aspect, the dimensions of the package and identification data (e.g., UUID associated with the package) that is assigned to the package (e.g., using assignment component 132) can be transmitted by package analysis device 120 to support server device 140. In an aspect, image capture component 126 can prune the image data to generate an image of the top surface of the package that represents only the portion of the surface focused on the package surface (e.g., no external environmental portions within the image for the package. Furthermore, the focused image data (e.g., of the focused top surface and label of the package) can be transmitted to label recognition device 110.

By transmitting, the focused image data to label recognition device 110, the system 100 creates processing and memory storage efficiencies. For instance, label recognition device 110 can perform processing operations faster due to the elimination of processing erroneous image data. In yet another aspect, image data stores corresponding to package analysis device 120 need not expend extra memory cost on erroneous image data. As such, package analysis device 120 can perform faster queries and more efficient access of image data from memories and data stores associated with system 100. In another aspect, label recognition device 110 can employ image recognition component 112 to receive image data (from package analysis device 120) and in some embodiments isolate label portions of respective images.

Furthermore, in an aspect, label recognition device 110 can employ character extraction component 114 to execute optical character recognition operations and character extraction operations. For instance, character extraction component 114 can retrieve text, numerals, and alphanumeric characters from the label image data. Furthermore, in some embodiments, lower case letters can be removed from analysis given that labels provide user name data in upper case letters. As such, a determination of characters that represent a user name can be accomplished expediently based on the elimination of processing extraneous characters. In another aspect, character extraction component 114 can compare one or more user name extracted from the label data to a list of user names using Levenstein metrics. For instance, recipient data associated with packages can be stored in a data store. Furthermore, an analysis employing Levenstein distance metrics can determine the similarity of words representing user names.

In an aspect, the Levenstein distance metrics can employ an adaptive threshold to indicate the similarity between characters representing a user name and a user name in a recipient or deliverer data store. For instance, a package label can list "John Doe" as a user name, however, a user name in the recipient data store can present "John D.". In order to match John Doe with John D., the Levenstein metrics can determine a distance between the number of characters representing each name presents a sufficient similarity to determine the user name is a match. Furthermore, in an instance Levenstein metrics and adaptive thresholds can be employed to match a business with a user name. For instance, secondary information can be utilized to identify the user name with the proper user. If there are three John Doe's in a database, a business name data, for instance, can be utilized (from the label data) to determine (e.g., using character extraction component 114) the respective user is identified in association with the package.

In a non-limiting embodiment, an administrative user can perform a matching of a user name to recipient label information in the event multiple or no names are determined. Furthermore, a machine learning model can be deployed to compare the activities performed by an administrative user and conduct similar decision activities in an automated manner. In another aspect, upon determination of a recipient name, package analysis device 120 can employ assignment component 132 to assign the determined name to the recipient. As such, package analysis device 120 can transmit package image data, recipient name data, tracking number information, optical character recognized data, textual data, user identification data (UUID) and other such package data to support server device 140. In an aspect, support server device 140 can employ notification component 142 to transmit notification data to user devices (e.g., user device corresponding to the recipient).

In another aspect, support server device 140 can transmit package data (e.g., dimension data), optical character recognition data (e.g., label information), identification information (e.g., UUID), tracking number data, and package image information to exchange server device 150. In an instance, exchange server device 150 can employ data exchange component 152 to transmit UUID information and dimension data to smart locker server device 170. Furthermore, smart locker server device 170 can employ smart locker application 172 to transmit instructions (e.g., compartment door unlocking) to smart locker device 118, deposit packages into respective smart locker compartments, or closing of smart locker compartment doors. In another aspect, support server device 140 can transmit optical character recognition data and package image data to mailroom server device 180 which can employ mailroom application 172 to conduct location identification activities. In another aspect, data exchange component 152 can request information (at a predetermined time interval) from support server device 140. Furthermore, data exchange component 152 can push data to mailroom server device 180 and/or smart locker server device 170 rather than such devices pinging the support server device 140 on a predetermined basis. The pushing of data (as opposed to pinging) pursuant to queries or requests generates processing efficiencies and enhances system bandwidth rather than requiring continuous pinging by the mailroom server device 180 and smart locker server device 170. Furthermore, smart locker application 172 can determine an occupancy profile of compartments within smart locker device 118. Furthermore, application 172 can compare the dimensions of the package to available locker compartments and respective dimensions and assigns the package to the next smallest locker compartment to fit the package.

Figure 2A:
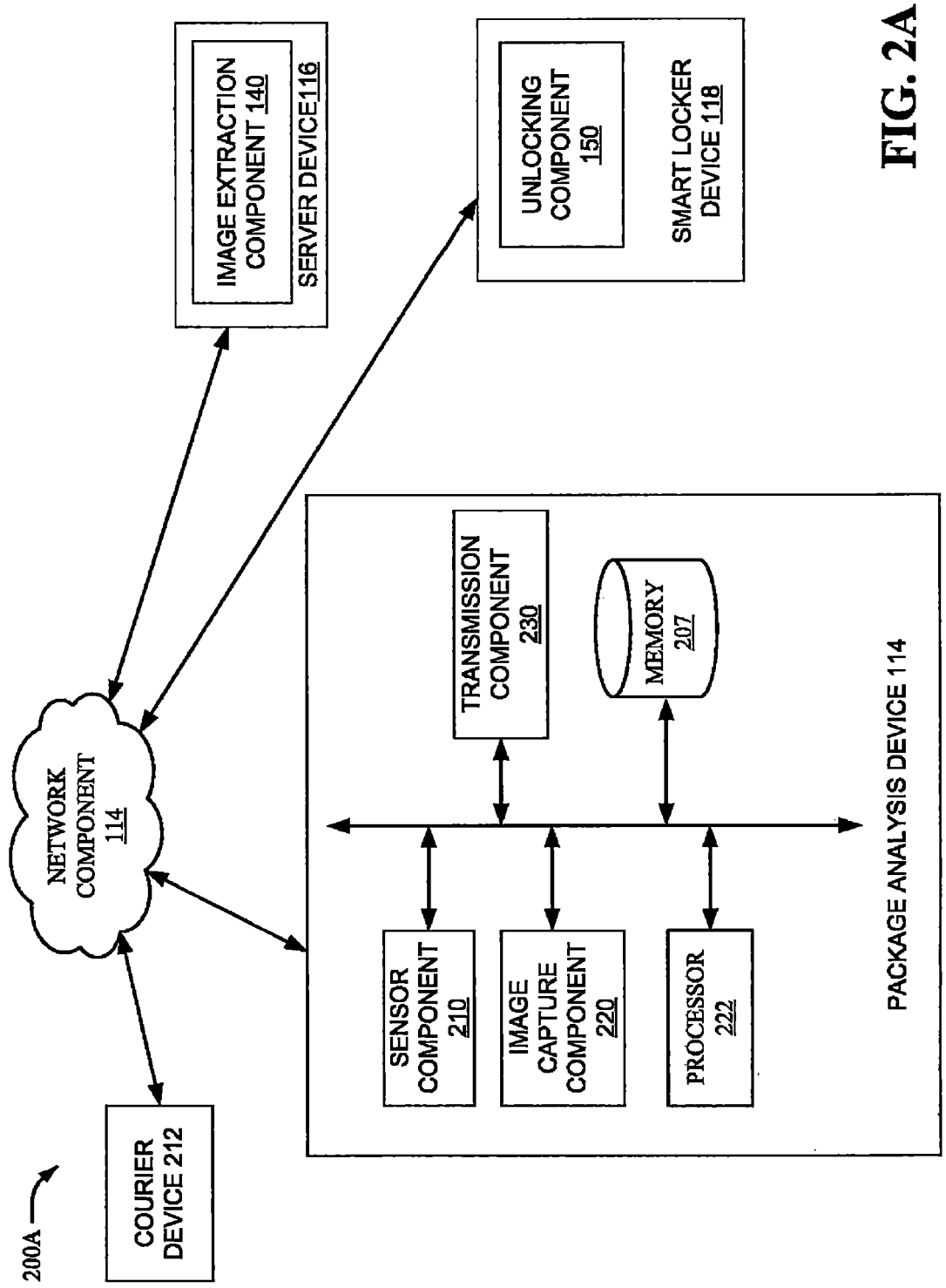
FIG. 2A illustrates a flow diagram of an example, non-limiting computer-implemented system 200A that facilitates an analysis of one or more package in accordance with one or more embodiments described herein.

Turning now to FIG. 2, illustrated is a non-limiting embodiment of package analysis system 200A comprising a courier device 212, package analysis device 114, server device 116, smart locker device 118, and network component 114. In an aspect, package analysis device 114 can comprise a sensor component 210, image capture component 220, transmission component 230, processor 222, and memory 207. In another aspect, server device 116 can comprise image extraction component 140. In yet another aspect, smart locker device 118 can comprise unlocking component 150.

In an aspect, the package analysis system 200A can facilitate the determination of a package size and identify a smart locker compartment for such package to fit within. In a non-limiting embodiment, the package analysis system 200A can determine a set of dimensions of a package such as length, width, and height. Furthermore, the package analysis system 200A can execute an optical character recognition operation to extract a set of package information from a package label. In yet another aspect, the package analysis system 200A can facilitate the unlocking and opening of an appropriate locker to fit the package based on the set of dimension data (e.g., length, width, height measurements of the package). In other non-limiting embodiments, a courier can be pointed to an appropriate location in a package room represented by a grid, wherein the appropriate location can fit the package (and subsequent packages) within the room in an orderly fashion.

In an embodiment, system 200A can include a courier device 212 that can be a user device such as a tablet, smart phone, personal digital assistant, and other such device. The courier can transmit courier information for authentication to verify the identity and legitimacy of the courier. The courier can place the package onto a podium of package analysis device 114. In an aspect, package analysis device 114 can employ sensor component 210 to measure a distance between the sensor and the top surface of the package viewed as an obstacle to measuring the distance to the podium. In an aspect, the sensor component 210 can be an ultrasonic sensor or other such sensor device. In an aspect, the sensor component 210 can continuously poll for a package at a set time interval (e.g., every other second). Furthermore, in a non-limiting embodiment, where an ultrasonic sensor is employed, such sensor can emit sound waves at a constant time interval. Accordingly, sensor component 210 can measure the distance to the top of the package based on the time taken for a sound wave to hit the package and deflect towards the ultrasonic sensor's receiver. As such, the distance to the top of the package can be subtracted from the distance between the sensor component 210 and the podium in order to determine the package height.

In another aspect, package analysis device 114 can employ an image capture component to capture an image of the package. In an embodiment, the sensing of a package by sensor component 210 can be transmitted (e.g., using transmission component 230) to a processor 222 (e.g., small single-board computer or multi-board computer) of package analysis device 114. Furthermore, in an aspect, upon transmission to processor 222, the data representing a presence of a package has occurred can result in the processor 222 transmitting instructions to trigger a capturing (e.g., using image capture component 220) of an image of the package. In another aspect, the image data can be processed (e.g., using processor 222 or an algorithm employed by a server device) to determine a length and width of the package. Furthermore, the set of image data or a subset of image data can be transmitted (e.g., using transmission component 230) to server device 116 that employs an image extraction component 140 that can retrieve package information from a package label. For instance, image extraction component 140 can employ an optical character recognition (OCR) technique to extract package information including, but not limited to, a recipient's name, courier name, form address, and tracking number from the package label.

In a non-limiting embodiment, the extracted package information can be transmitted to a data store and stored at a data store for later data retrieval and faster package processing in subsequent rounds of analysis. Furthermore, such information can be utilized in machine learning and predictive analysis to determine whom a package belongs to. In another non-limiting embodiment, the package analysis device 114 can transmit (e.g., using transmission component 230) a set of instructions to smart locker device 118 to unlock a respective compartment door for storage of the package. In an instance, the smart locker device 118 can employ unlocking component 150 to unlock and/or open a compartment door based on one or more factors such as package size and/or dimensions, package owner information, courier information, delivery schedule factors (other packages expected for delivery over a given period of time), requirements of package contents (e.g., needs refrigeration), estimated time of pickup of the package but package owner, and other such factors.

In another non-limiting aspect, absent a matching of package recipient's name (e.g., extracted package information) to a package, then an image stored in the data store can be accessed and matched to other information on the concerned packages label to assign a recipient's information to the concerned package based on a matching of label information within a given confidence interval. In an aspect network 114 can represent a distributed computing environment where tasks are performed by remote processing devices (e.g., servers, package analysis devices, data stores, etc.) that are linked through network 114 (e.g., communication network, cloud-based communication network, etc.). However, in some embodiments, aspects of this disclosure can be practiced on stand-alone computers. In some embodiments employing the disclosed systems over a distributed computing environment, program modules can be located in both local and remote memory storage devices.

In various non-limiting embodiments, system 200A can be utilized as a mobile application. In a non-limiting example process flow, a courier can access and launch a mobile application system employed by a mobile device to authenticate the courier. The courier can place a package on a platform of the package analysis device 114. In another aspect, the package analysis device 114 an determine package dimensions and the intended package recipient's information. Furthermore, the application can transmit data to smart locker device 116 along with instructions to open an appropriate locker compartment. In another aspect, the application can transmit a notification message to the recipient or target user to indicate a package is awaiting the user pickup.

In yet another aspect, system 200A can be employed in a package room setting. In a non-limiting example process flow, a courier can access and launch a mobile application system employed by a mobile device to authenticate the courier. Furthermore, a package room door can unlock and open based on verification of the courier credentials/authentication. The courier can place a package on a platform of the package analysis device 114. In another aspect, the package analysis device 114 an determine package dimensions and the intended package recipient's information. In an aspect, the application can display grid information at a user interface of the couriers' user device indicating a location within the package room to drop-off the package. In another aspect, the application can transmit a notification message to the recipient or target user to indicate a package is awaiting the user pickup. In some non-limiting embodiments, computer-vision technologies can be employed by system 200A to identify packages with label obfuscation.

Figure 2B:
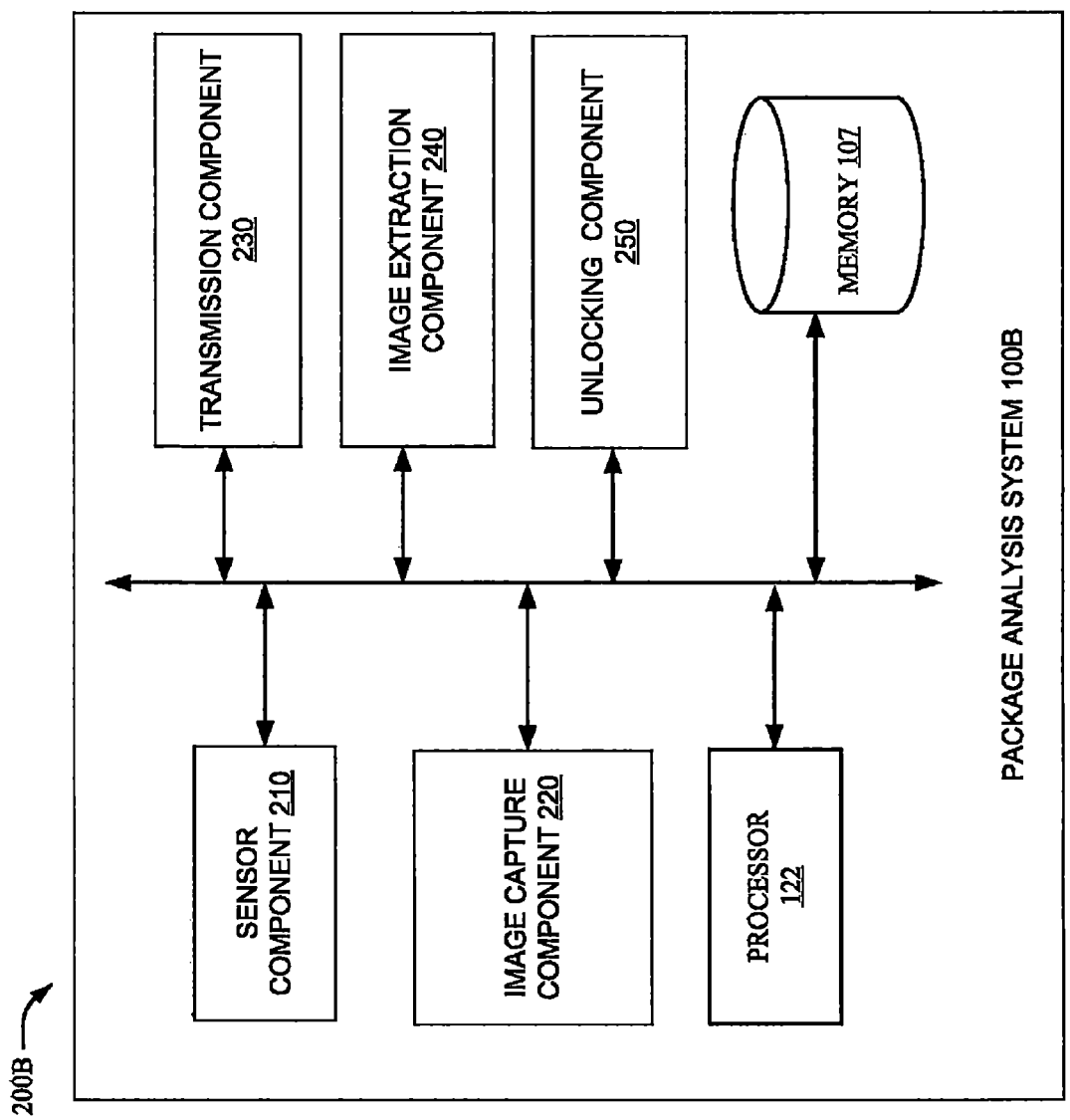
FIG. 2B illustrates a flow diagram of an example, non-limiting computer-implemented system 100B that facilitates an analysis of one or more package in accordance with one or more embodiments described herein.

Turning now to FIG. 2B, illustrated is a package analysis system 200B comprising a sensor component 210, image capture component 220, transmission component 230, image extraction component 240, unlocking component 250, processor 122, and memory 107. In an aspect, system 200A and system 200B can include or otherwise be associated with one or more processor 122 that can execute the computer executable components and/or computer instructions stored in memory 107. In some aspects, the systems and devices disclosed herein can include generation of digital data based on pattern recognition algorithms and data similarity algorithms as well as storage and retrieval of digitally generated data to and from a memory (e.g., using memory 108) in accordance with computer generated access patterns that cannot be replicated by a human.

Figure 2C:
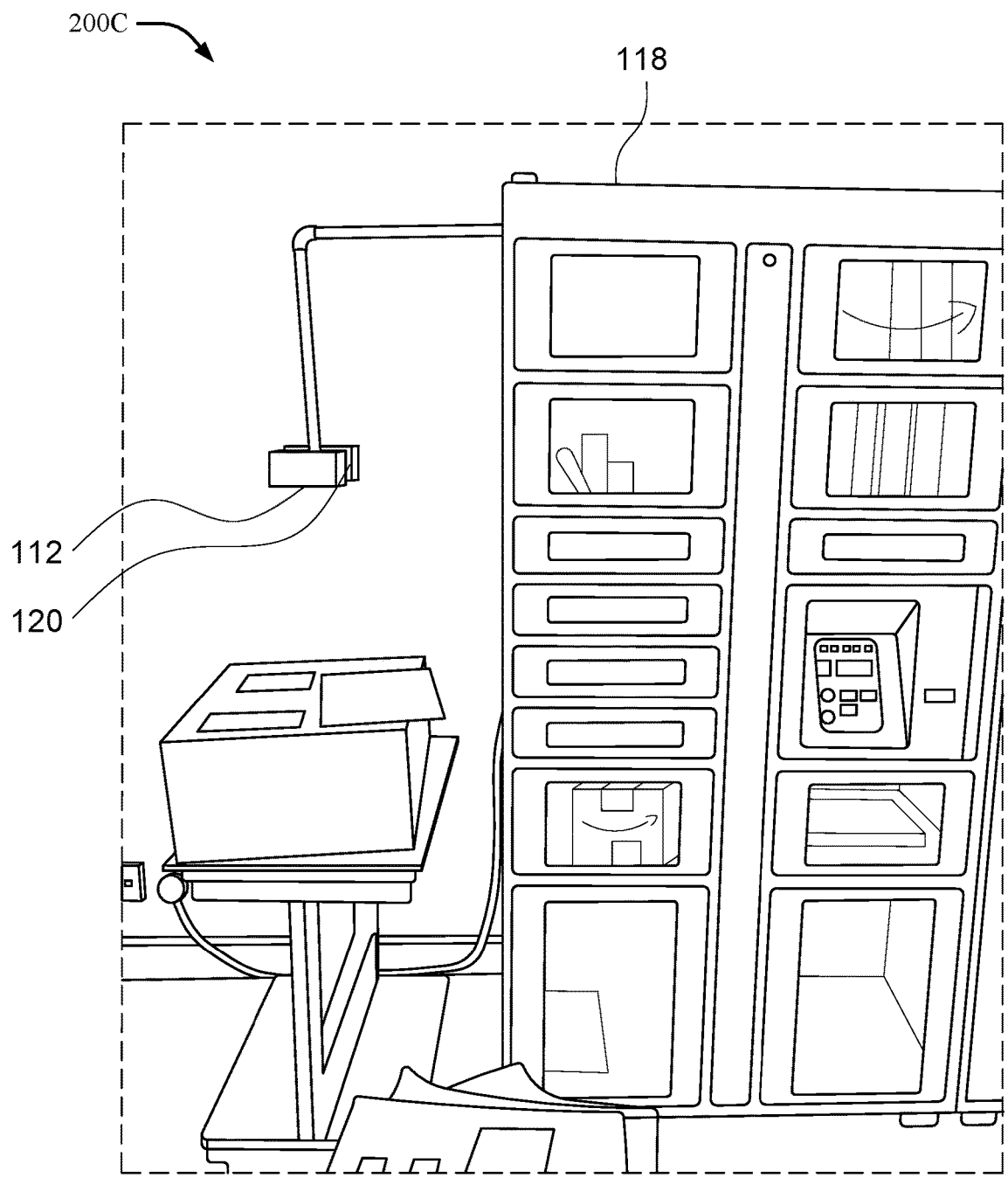
FIG. 2C illustrates an image of an example, non-limiting computer-implemented device 100C that facilitates an analysis of one or more package in accordance with one or more embodiments described herein.

Turning now to FIG. 2C, illustrated is an image of an example, non-limiting computer-implemented device 200C that facilitates an analysis of one or more package in accordance with one or more embodiments described herein. In an aspect, included are sensor component 210, image capture component 220, and smart locker device 118.

Figure 3A:
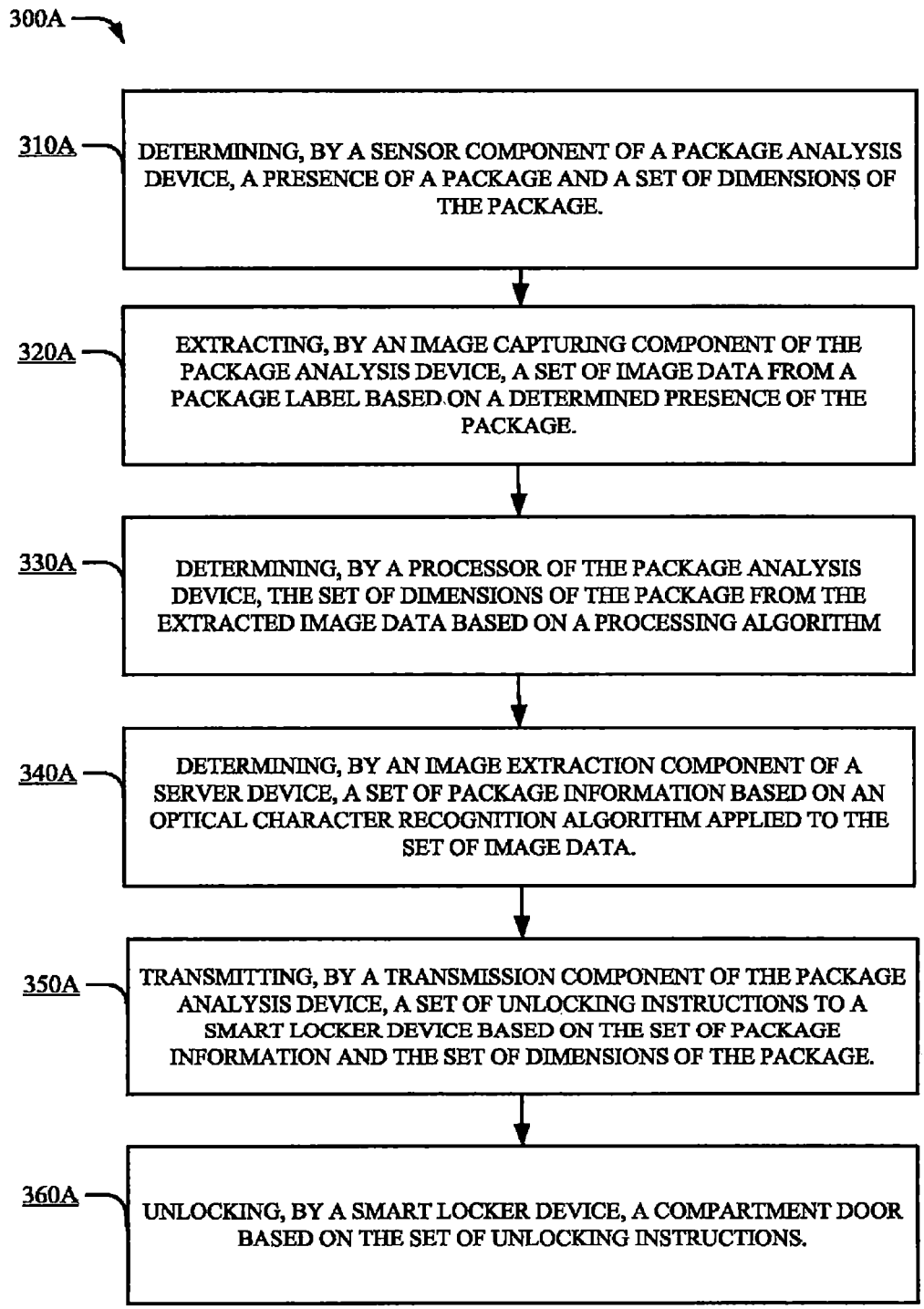
FIG. 3A illustrates a flow diagram of an example, non-limiting computer-implemented method that facilitates an analysis of one or more package in accordance with one or more embodiments described herein.

Turning now to FIG. 3A, illustrated is a flow diagram of an example, non-limiting computer-implemented method 300A that facilitates an analysis of one or more package in accordance with one or more embodiments described herein. In an aspect, one or more of the components described in computer-implemented method 300A can be electrically and/or communicatively coupled to one or more devices. Repetitive description of like elements employed in other embodiments described herein is omitted for sake of brevity. In some implementations, at reference numeral 310A, a system operatively coupled to a processor (e.g., processor 122) can determine (e.g., using sensor component 210), a presence of a package and a set of dimensions of the package. At reference numeral 320A, the system can extract (e.g., using image capture component 220) a set of image data from a package label based on a determined presence of the package. At reference numeral 330A, the system can determine (e.g., using processor 122) the set of dimensions of the package from the extracted image data based on a processing algorithm. At reference numeral 340A, the system can determine (e.g., using image extraction component 240) a set of package information based on an optical character recognition algorithm applied to the set of image data. At reference numeral 350A, the system can transmit (e.g., using transmission component 230), a set of unlocking instructions to a smart locker device 118 based on the set of package information and the set of dimensions of the package. At reference numeral 360A, the system can unlock (e.g., using unlocking component 150) a compartment door based on the set of unlocking instructions.

Figure 3B:
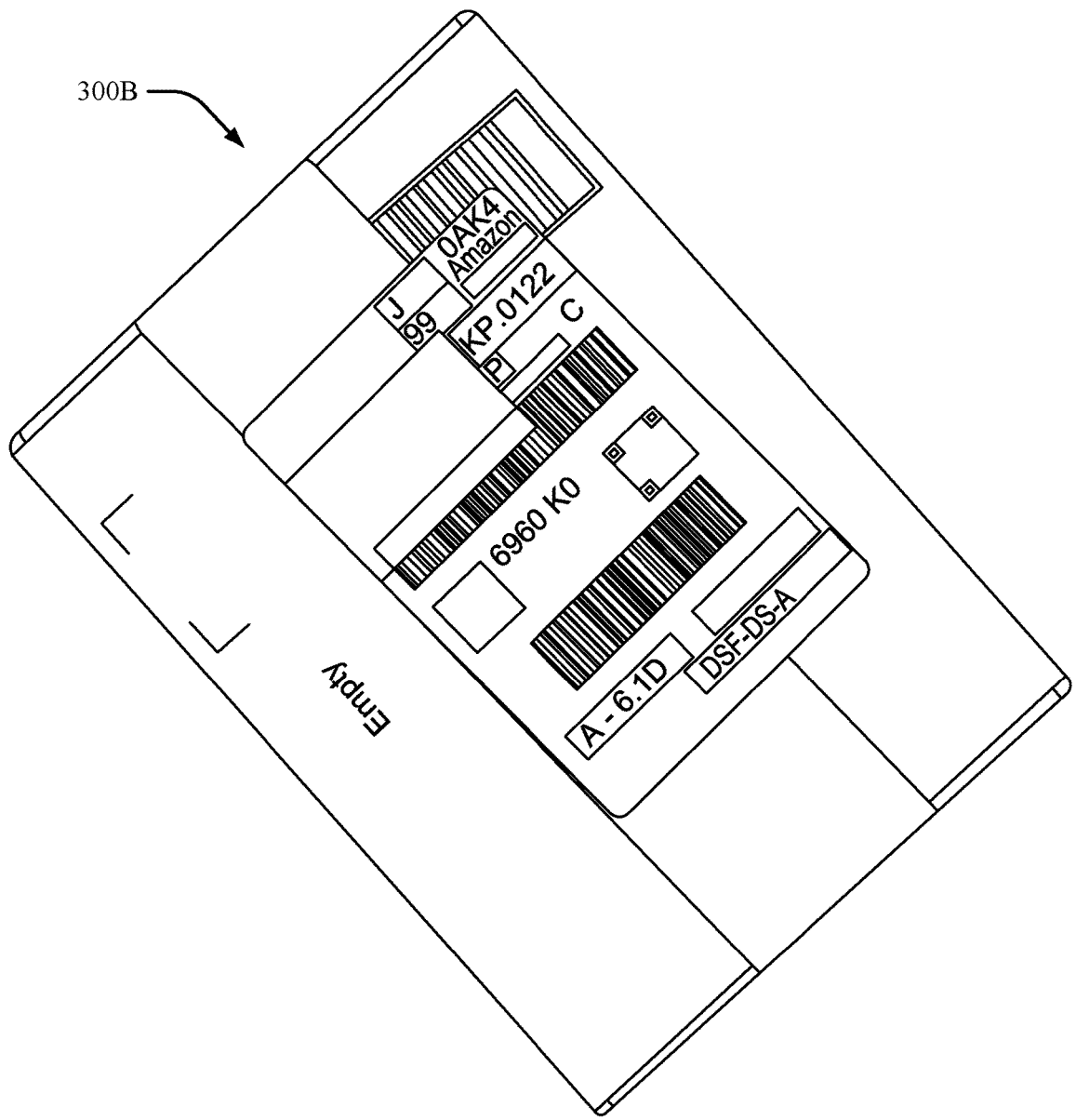
FIG. 3B illustrates a non-limiting package with clear contours determined in accordance with one or more embodiments described herein.

Turning now to FIG. 3B, illustrated is a non-limiting package with clear contours determined in accordance with one or more embodiments described herein. In an aspect, illustration 300B depicts an image of a package captured by camera portion 122.

Figure 3C:
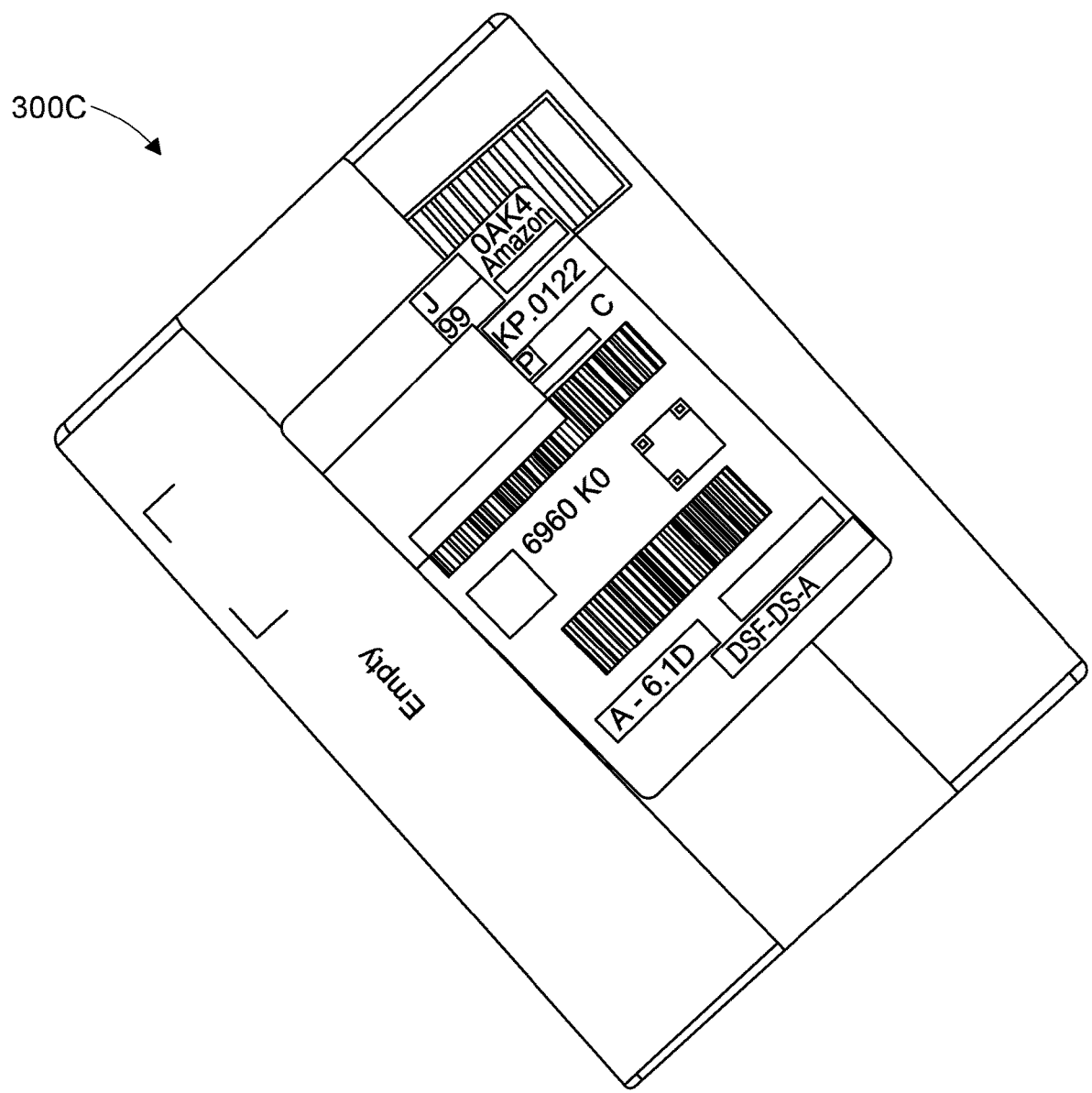
FIG. 3C illustrates a non-limiting package with bounding box corners positioned to determine pixel dimensions for an image in accordance with one or more embodiments described herein.

Turning now to FIG. 3C, illustrated is a non-limiting package with bounding box corners positioned to determine pixel dimensions for an image in accordance with one or more embodiments described herein. In an aspect, illustration 300C depicts an image of a package captured by camera portion 122 with bounding box corners.

Figure 3D:
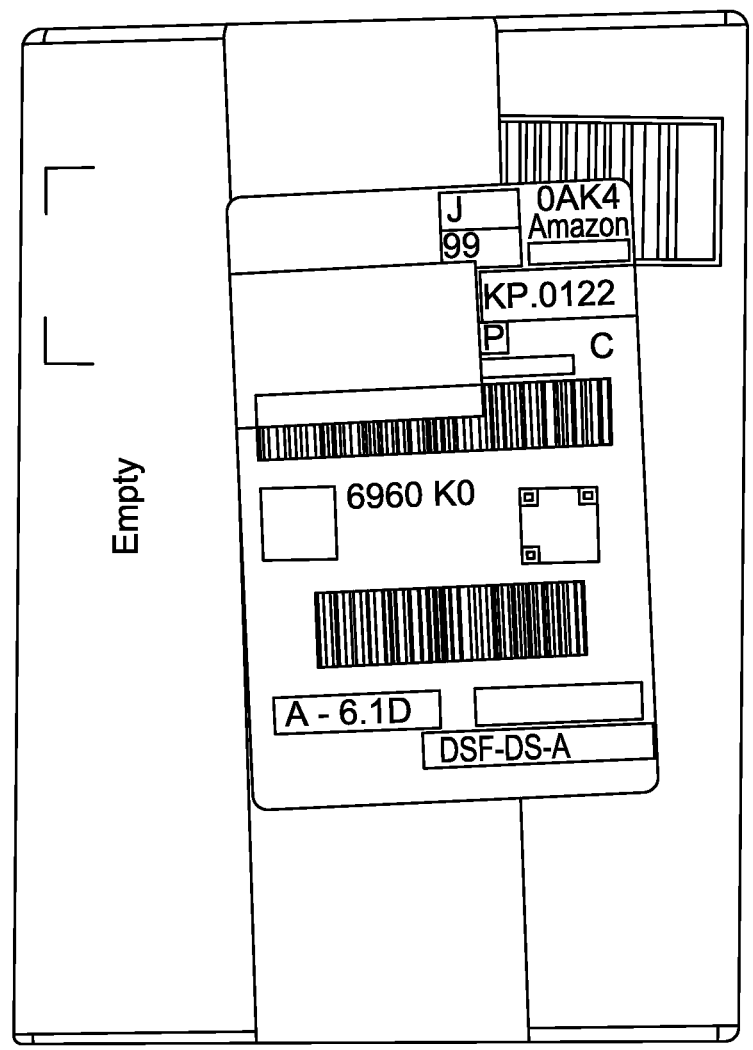
FIG. 3D illustrates a non-limiting package image transformed to achieve an image of a package label in accordance with one or more embodiments described herein.

Turning now to FIG. 3D, illustrated is a non-limiting package image transformed to achieve an image of a package label in accordance with one or more embodiments described herein. In an aspect, illustration 300D depicts an image of an isolated label of the package captured by camera portion 122.

Figure 3E:
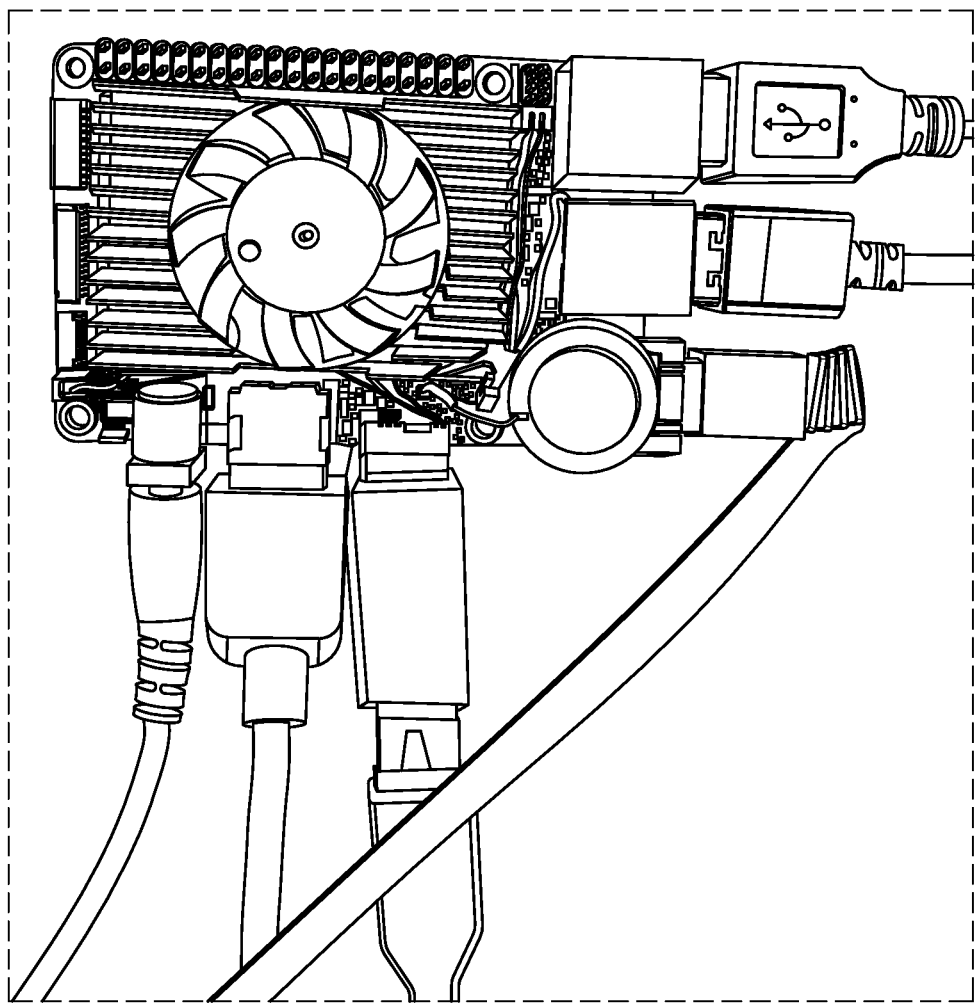
FIG. 3E illustrates a non-limiting computer board in accordance with one or more embodiments described herein.

Turning now to FIG. 3E, illustrated is a non-limiting computer board in accordance with one or more embodiments described herein.

Figure 3F:
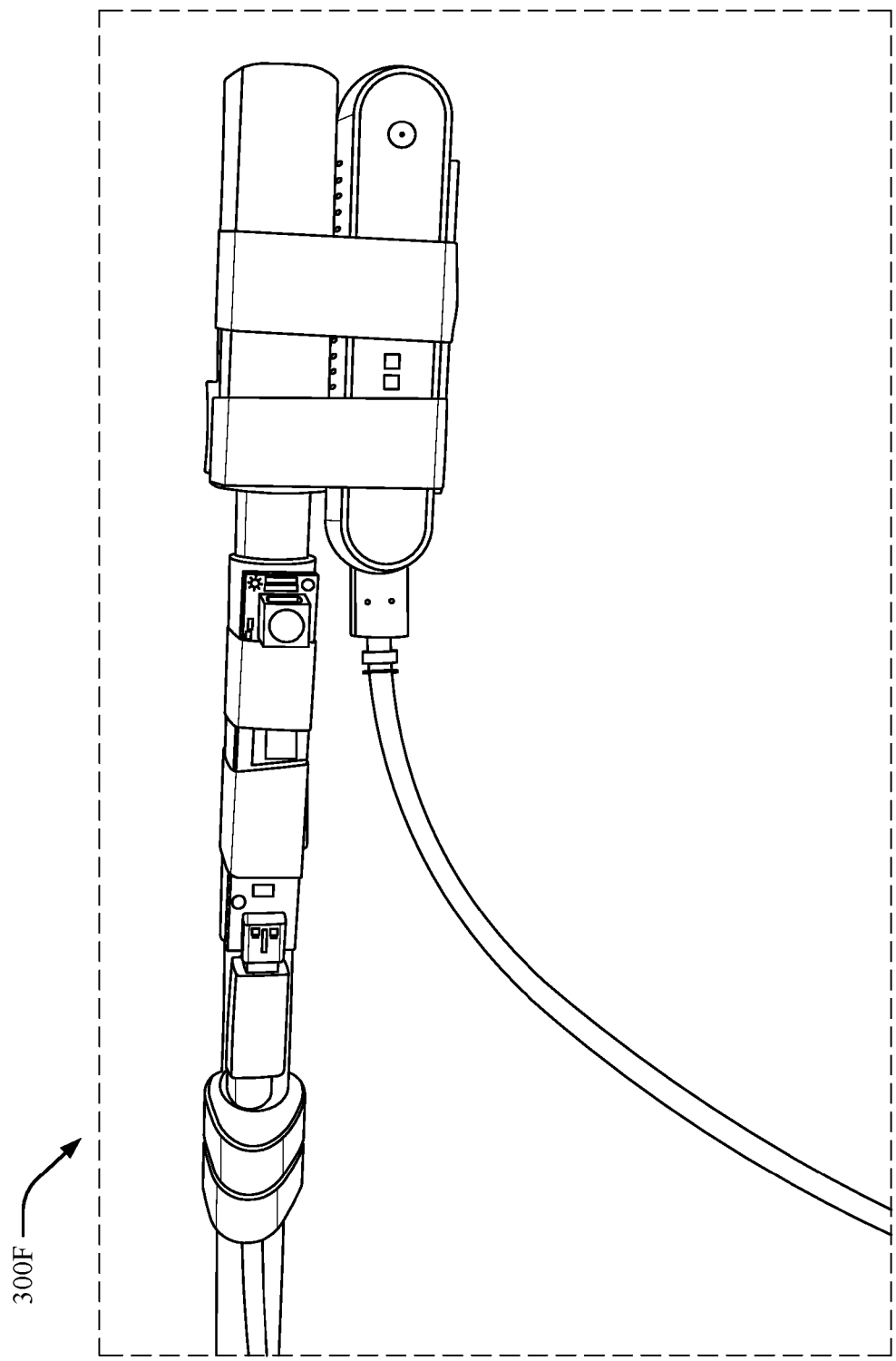
FIG. 3F illustrates a non-limiting package analysis device comprising camera portions and depth sensor portions in accordance with one or more embodiments described herein.

Turning now to FIG. 3F, illustrated is a non-limiting package analysis device comprising camera portions and depth sensor portions in accordance with one or more embodiments described herein.

Figure 3G:
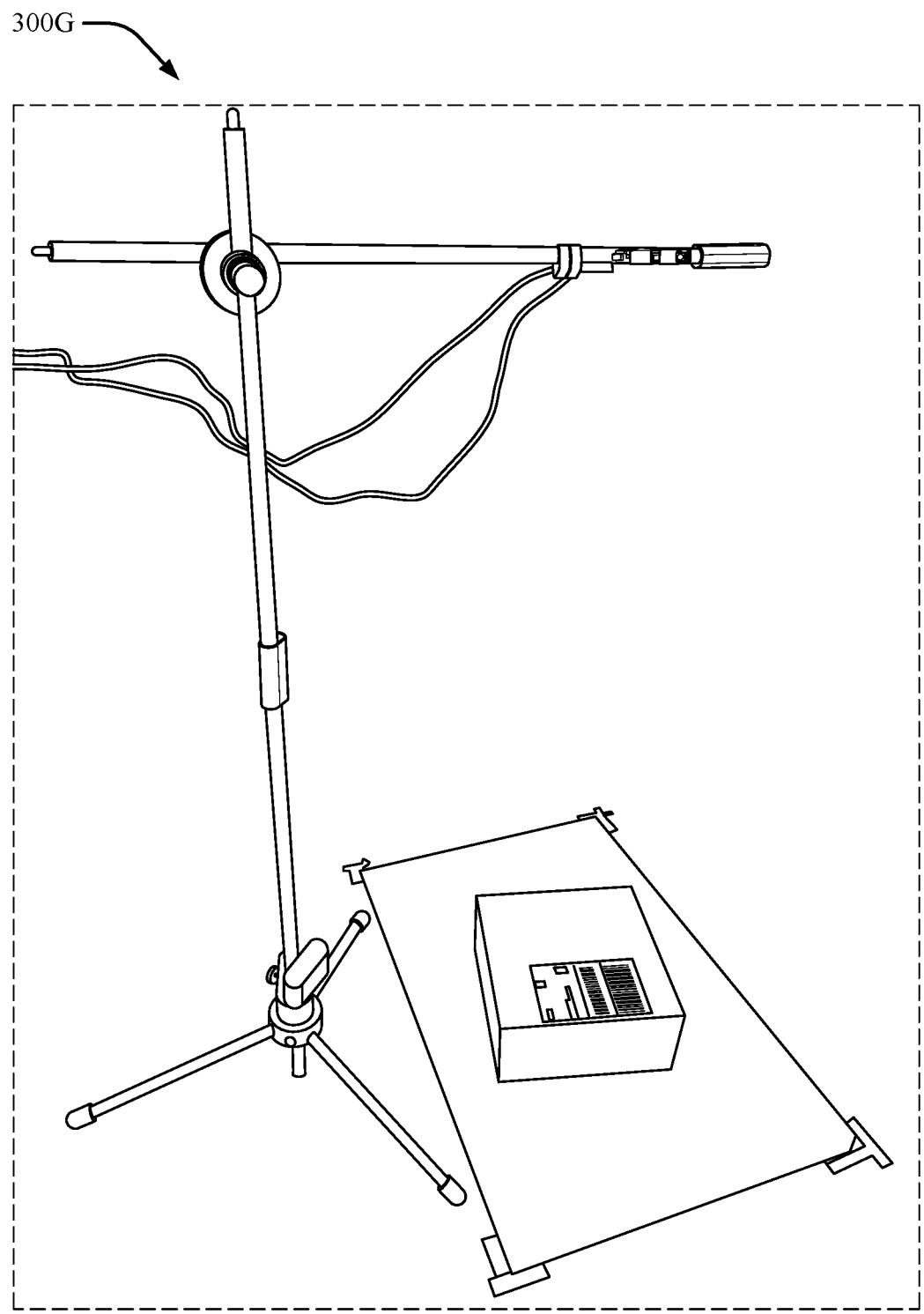
FIG. 3G illustrates a non-limiting stand of package analysis device in accordance with one or more embodiments described herein.

Turning now to FIG. 3G, illustrated is a non-limiting stand of package analysis device in accordance with one or more embodiments described herein.

Figure 4:
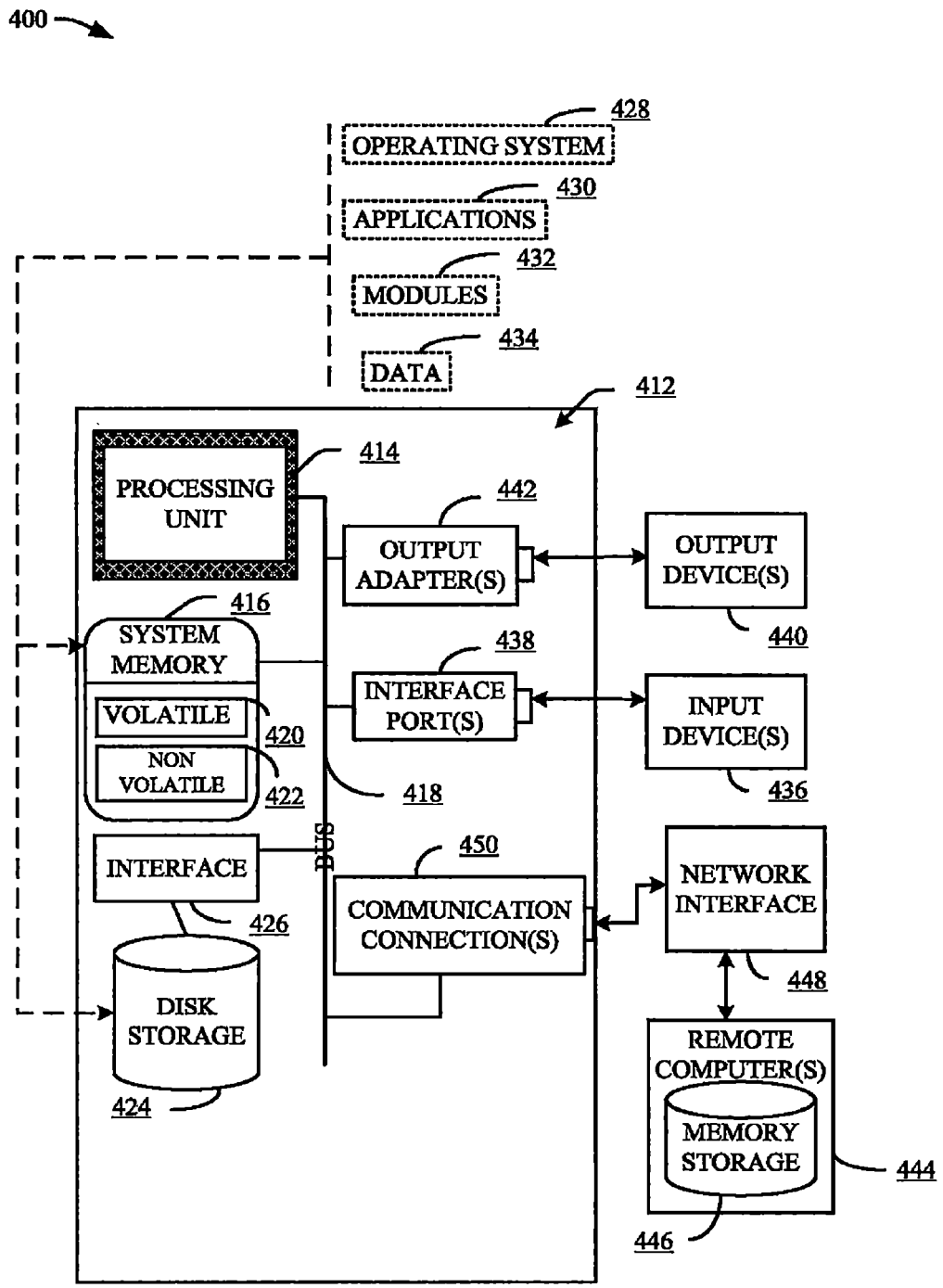
FIG. 4 illustrates a flow diagram of an example, non-limiting operating environment in which one or more embodiments described herein can be facilitates.

In order to provide a context for the various aspects of the disclosed subject matter, FIG. 4 as well as the following discussion is intended to provide a general description of a suitable environment in which the various aspects of the disclosed subject matter can be implemented. FIG. 4 illustrates a block diagram of an example, non-limiting operating environment in which one or more embodiments described herein can be facilitated. With reference to FIG. 4, a suitable operating environment 400 for implementing various aspects of this disclosure can also include a computer 412. The computer 412 can also include a processing unit 414, a system memory 416, and a system bus 418. The system bus 418 couples system components including, but not limited to, the system memory 416 to the processing unit 414.

The processing unit 414 can be any of various available processors. Dual microprocessors and other multiprocessor architectures also can be employed as the processing unit 414. The system bus 418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 416 can also include volatile memory 420 and nonvolatile memory 422. The basic input/output system (BIOS), containing the basic routines to transfer information between elements within the computer 412, such as during start-up, is stored in nonvolatile memory 422. By way of illustration, and not limitation, nonvolatile memory 422 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 412 can also include removable/non-removable, volatile/non-volatile computer storage media. FIG. 4 illustrates, for example, a disk storage 424. Disk storage 424 can also include, but is not limited to, devices like a magnetic disk drive, floppy disk drive, tape drive, Jaz drive, Zip drive, LS-100 drive, flash memory card, or memory stick. The disk storage 424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 424 to the system bus 418, a removable or non-removable interface is typically used, such as interface 426. FIG. 4 also depicts software that acts as an intermediary between users and the basic computer resources described in the suitable operating environment 400. Such software can also include, for example, an operating system 428. Operating system 428, which can be stored on disk storage 424, acts to control and allocate resources of the computer 412.

System applications 430 take advantage of the management of resources by operating system 428 through program modules 432 and program data 434, e.g., stored either in system memory 416 or on disk storage 424. It is to be appreciated that this disclosure can be implemented with various operating systems or combinations of operating systems. A user enters commands or information into the computer 412 through input device(s) 436. Input devices 436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 414 through the system bus 418 via interface port(s) 438.

Interface port(s) 438 include, for example, a serial port, a parallel port, a game port, and a universal serial bus (USB). Output device(s) 440 use some of the same type of ports as input device(s) 436. Thus, for example, a USB port can be used to provide input to computer 412, and to output information from computer 412 to an output device 440. Output adapter 442 is provided to illustrate that there are some output device 440 like monitors, speakers, and printers, among other such output device 440, which require special adapters. The output adapters 442 include, by way of illustration and not limitation, video and sound cards that provide a means of connection between the output device 440 and the system bus 418. It should be noted that other devices and/or systems of devices provide both input and output capabilities such as remote computer(s) 444.

Computer 412 can operate in a networked environment using logical connections to one or more remote computers, such as remote computer(s) 444. The remote computer(s) 444 can be a computer, a server, a router, a network PC, a workstation, a microprocessor based appliance, a peer device or other common network node and the like, and typically can also include many or all of the elements described relative to computer 412. For purposes of brevity, only a memory storage device 446 is illustrated with remote computer(s) 444. Remote computer(s) 444 is logically connected to computer 412 through a network interface 448 and then physically connected via communication connection 450. Network interface 448 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 450 refers to the hardware/software employed to connect the network interface 448 to the system bus 418. While communication connection 450 is shown for illustrative clarity inside computer 412, it can also be external to computer 412. The hardware/software for connection to the network interface 448 can also include, for exemplary purposes only, internal and external technologies such as, modems including regular telephone grade modems, cable modems and DSL modems, ISDN adapters, and Ethernet cards.

Figure 5:
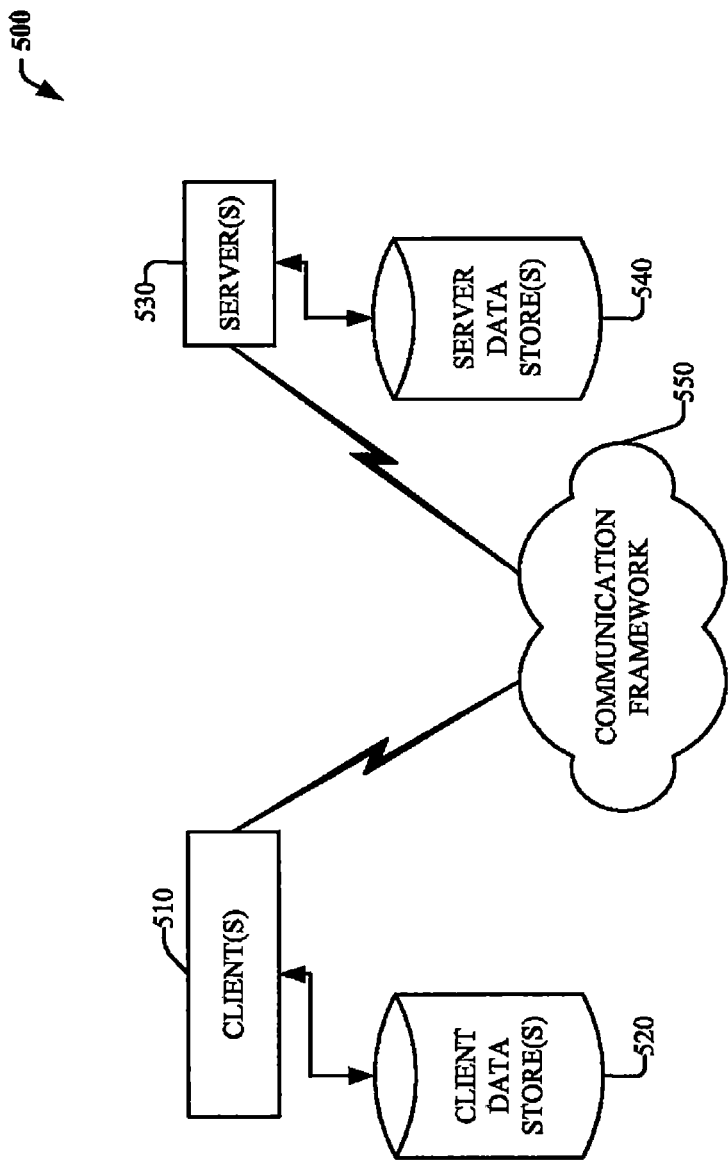
FIG. 5 illustrates a flow diagram of an example, non-limiting operating environment in which one or more embodiments described herein can be facilitated.

Referring now to FIG. 5, there is illustrated a schematic block diagram of a computing environment 500 in accordance with this disclosure. The system 500 includes one or more client(s) 502 (e.g., laptops, smart phones, PDAs, media players, computers, portable electronic devices, tablets, and the like). The client(s) 502 can be hardware and/or software (e.g., threads, processes, computing devices). The system 500 also includes one or more server(s) 504. The server(s) 504 can also be hardware or hardware in combination with software (e.g., threads, processes, computing devices). The servers 504 can house threads to perform transformations by employing aspects of this disclosure, for example. One possible communication between a client 502 and a server 504 can be in the form of a data packet transmitted between two or more computer processes wherein the data packet may include video data. The data packet can include a metadata, e.g., associated contextual information, for example. The system 500 includes a communication framework 506 (e.g., a global communication network such as the Internet, or mobile network(s)) that can be employed to facilitate communications between the client(s) 502 and the server(s) 504.

Communications can be facilitated via a wired (including optical fiber) and/or wireless technology. The client(s) 502 include or are operatively connected to one or more client data store(s) 508 that can be employed to store information local to the client(s) 502 (e.g., associated contextual information). Similarly, the server(s) 504 are operatively include or are operatively connected to one or more server data store(s) 510 that can be employed to store information local to the servers 504. In one embodiment, a client 502 can transfer an encoded file, in accordance with the disclosed subject matter, to server 504. Server 504 can store the file, decode the file, or transmit the file to another client 502. It is to be appreciated, that a client 502 can also transfer uncompressed file to a server 504 and server 504 can compress the file in accordance with the disclosed subject matter. Likewise, server 504 can encode video information and transmit the information via communication framework 506 to one or more clients 502.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by a camera portion of a package analysis device comprising a processor, a distance between the package analysis device and a top surface of the package, wherein the distance is represented by distance data;
   capturing, by the camera portion of the package analysis device, a set of first images of the top surface of the package representing a set of boundaries of the top surface of the package and a second image of a label of the package, wherein the camera portion employs an industrial camera capture mechanism configured to generate a set of image data based on a set of clarity criteria, and wherein the industrial camera capture mechanism terminates upon satisfaction of the set of clarity criteria;
   determining, by the package analysis device, dimensions of the top surface of the package based on an analysis of the set of first images;
   receiving, by the package analysis device, label data based on an optical character analysis of the second image by a label recognition device;
   generating, by the package analysis device, identifier data corresponding to the package; and
   transmitting, by the package analysis device, the identifier data, the dimensions of the top surface of the package, the distance data and the label data to a support server device.

2. The method of claim 1, wherein the camera portion employs a depth sensor to determine the distance based on a detected change in depth between the package analysis device and a surface configured to support the package.

3. The method of claim 1, further comprising determining, by the package analysis device, the contours of the set of boundaries based on an integration of pixels the set of first images comprising a similar color and a similar intensity corresponding to a first value above a threshold color value and a second value above a threshold intensity value.

4. The method of claim 1, further comprising unlocking, by a smart locker device, a target compartment of the smart locker device based on a comparison of the dimensions of the top surface of the package and the distance data to a set of compartment dimensions.

5. A system comprising:
   a memory that stores computer executable components;
   at least one processor that executes the computer executable components stored in the memory, wherein the computer executable components comprise:
   a package analysis device configured to:
      determine, using a camera portion, dimensions of a package,
         wherein the camera portion employs distance capture component configured to determine a distance between the package analysis device and a top surface of the package, wherein the distance is represented by distance data, wherein the camera portion employs image capture component to capture a set of first images of the top surface of the package representing a set of boundaries of the top surface of the package and a second image of a label of the package, and wherein the set of first image data is captured based on a set of clarity criteria, employed by an industrial camera capture component of the camera portion that terminates upon satisfaction of the set of clarity criteria;

a label recognition device configured to:

extract characters from a subset of the first image data representing a package label based on optical character recognition techniques;

determine label information based on the extracted characters a support server device configured to:
provision notifications to user devices;
provision package data to one or more smart locker device; and
provision optical character recognition data to a mailroom server device;

an exchange server device configured to:
provision package identification data and package dimension data to the one or more smart locker device;

a smart locker server device configured to:
provision executable instructions to the one or more smart locker device, wherein the executable instructions render an operable act of the smart locker upon execution.

6. A method comprising:

receiving, by a smart locker application executed by a processor of a smart locker server device, a set of package data comprising identifier data, package dimension data corresponding to the top surface of the package, distance data, image data and label data, wherein the image data is captured based on a set of clarity criteria established by an industrial camera capture mechanism of a package analysis device;

matching, by the smart locker application executed by the processor, the package to a compartment of the smart locker device based on a comparison of compartment dimensions of the compartment to the set of package data; and provisioning, by the smart locker application executed by the processor, an executable operational instruction to the smart locker device based on the comparison.

7. The method of claim 6, further comprising transmitting, by the smart locker application executing on the smart locker server, an unlock command to the smart locker device based on the comparison.

8. The method of claim 7, further comprising unlocking, by the smart locker device, a compartment door of the compartment based on the unlock command.

9. The method of claim 8, further comprising receiving, by the smart locker application, event data representing a closing of the compartment door.

10. The method of claim 9, further comprising triggering a transmission of locking instructions to the smart locker device based on the closing of the compartment door.

11. The system of claim 5, further comprising the one or more smart locker device communicatively coupled to the processor, wherein the smart locker device is configured to store the package in an unoccupied locker compartment of the smart locker device.

12. The system of claim 5, further comprising a mailroom server device configured to identify locations for storage of the package within a mailroom.

13. The system of claim 5, further comprising a courier device configured to:

provision authentication information to the smart locker server device; and verify the identity of a user corresponding to the courier device based on the authentication information.

14. The system of claim 5, wherein the executable instructions are configured to:

unlock a compartment door of the one or more smart locker device; and open the compartment door of the smart locker device, wherein the compartment door corresponds to a compartment size larger than the package for storage.

15. The system of claim 5, wherein the package analysis device is further configured to search for image clarity of an image at least based on a clarity and time frame requirements.

16. The system of claim 5, wherein the package analysis device is further configured to:

scan the package; and provision the determined dimensions of the package to a smart locker application executed by a processor of the smart locker server device.

17. The system of claim 5, wherein the label recognition device is further configured to remove image data of the set of first images based on relevance to label identification requirements.

18. The system of claim 5, wherein the label recognition device is further configured to isolate relevant portions of image data of the set of first images for analysis based on relevance to label identification requirements.

19. The system of claim 5, wherein the smart locker server device is configured to push data to user devices based on query requests.

20. The method of claim 6, further comprising verifying, by the smart locker server device, the identity of a courier device requesting access to package information or smart locker device information.

* * * * *